MAX H. KUHNER
EARLE C. MILLER
INVENTORS

BY

Feb. 2, 1965    M. H. KUHNER ETAL    3,168,074
WASTE LIQUOR FURNACE
Filed May 24, 1962    2 Sheets-Sheet 2

MAX H. KUHNER
EARLE C. MILLER
INVENTOR.

BY

United States Patent Office 3,168,074
Patented Feb. 2, 1965

3,168,074
WASTE LIQUOR FURNACE
Max H. Kuhner, Oakham, and Earle C. Miller, Worcester, Mass., assignors to Riley Stoker Corporation, Worcester, Mass., a corporation of Massachusetts
Filed May 24, 1962, Ser. No. 197,400
9 Claims. (Cl. 122—235)

This invention relates to a waste liquor furnace and, more particularly, to apparatus arranged to produce steam by burning combustible material in the form of a liquid suspension thereof.

In the operation of certain industries, there occur areas of production in which substances emerge in a water suspension and it is sometimes desirable to introduce this liquor into a furnace. In the paper industry, for instance, there occur suspensions and solutions of chemicals which must be disposed of and which it is economical to dry by introduction into the furnace of a steam generating unit, even though the heat value obtainable by burning the chemical is not great enough to evaporate the water which carries it. As an example, wood sugars emerge from the paper-making operation in this condition, and the only reason for "burning" such a liquor is as a means of disposal. At the same time, there are suspensions in the paper industry from which it is desirable to recover a chemical for re-use. In the case of black liquor, the furnace is used not only to drive off the water, but also to promote a chemical reaction which converts the chemical in the liquor to a more desirable form; such a situation exists in reducing sodium carbonate to sodium oxide. Whether the liquor be introduced into the steam generating unit as a means of disposal, as a means of chemical recovery, or, even, because of the heat recoverable from the chemical, there are certain commonly-encountered problems. It is difficult, for instance, to keep the heat exchange surfaces clean because of the sticky nature of the substance. Also, it is necessary immediately to evaporate the water, otherwise it is difficult to maintain ignition. These and other problems encountered with the prior art apparatus have been obviated in a novel manner by the present invention.

It is, therefore, an outstanding object of the invention to provide a waste liquor furnace in which the water in a suspension is quickly evaporated so that ignition is stabilized.

Another object of this invention is the provision of a waste liquor furnace in which recovered chemicals are maintained in a liquid condition for ease in removal from the furnace.

A further object of the present invention is the provision of a waste liquor furnace in which particles of solid matter are readily and effectively recovered from the back passes of a steam generating unit.

It is another object of the instant invention to provide a waste liquor furnace of such a nature that sticky semi-solid substances are not retained on heat exchange surfaces.

It is a further object of the invention to provide a waste liquor furnace in which the nature of the evaporation and combustion of the suspension is readily and easily controlled.

A still further object of this invention is the provision of a waste liquor furnace in which the vertical height of the combustion chamber is relatively small without carry-over of solid particles into convection heat exchange surfaces.

With these and other objects in view, as will be apparent to those skilled in the art, the invention resides in the combination of parts set forth in the specification and covered by the claims appended hereto.

The character of the invention, however, may be best understood by reference to one of its structural forms as illustrated by the accompanying drawings in which.

Figure 1:
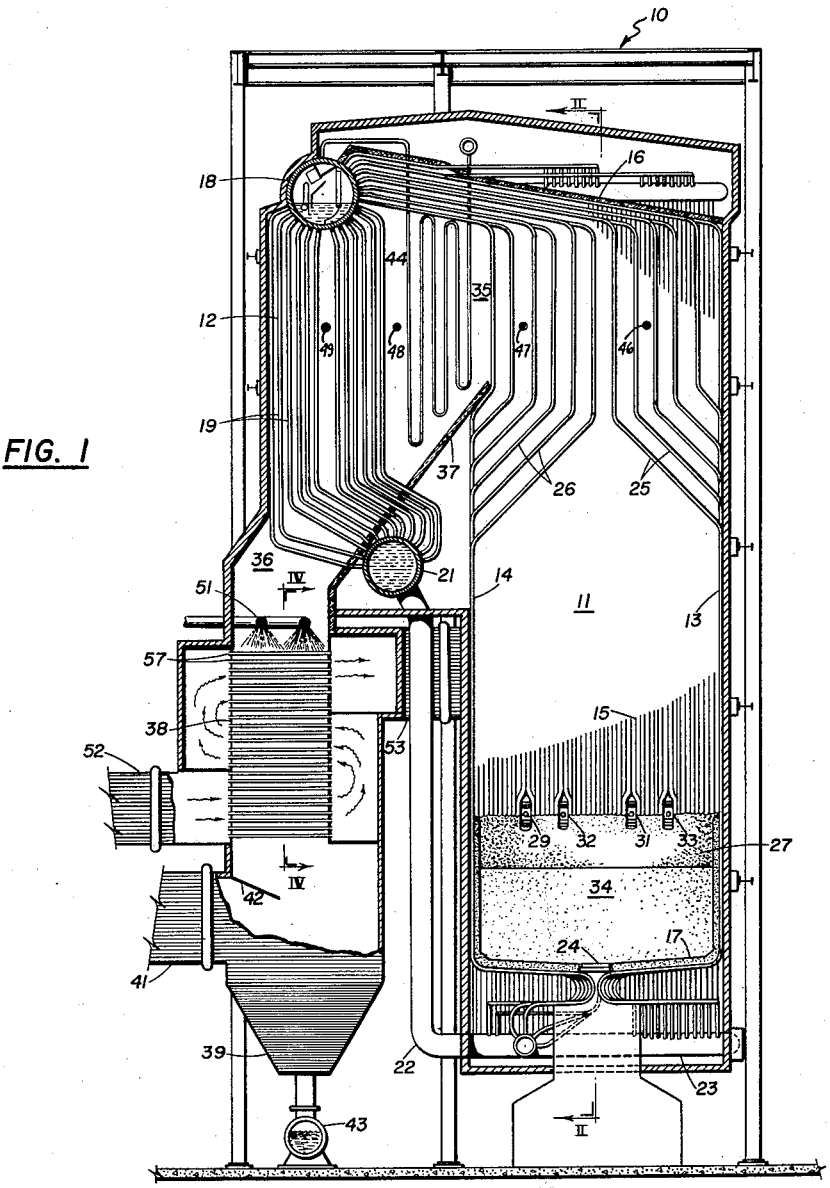
FIG. 1 is a vertical longitudinal sectional view of a waste liquor furnace embodying the principles of the present invention.
Figure 2:
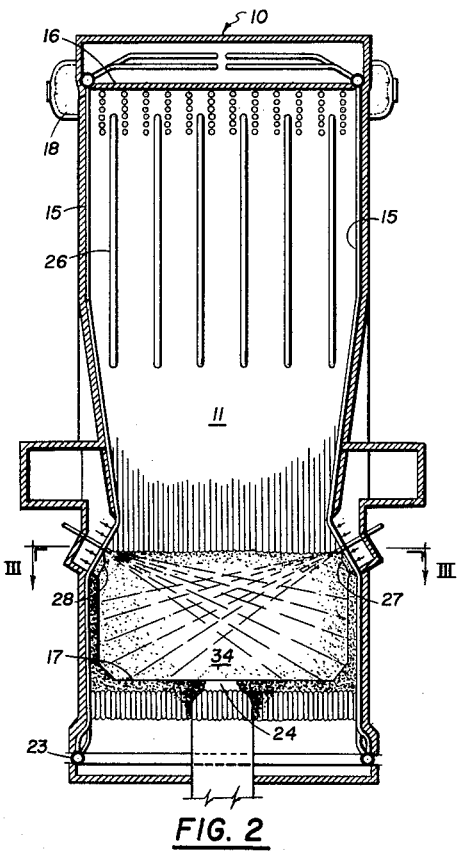
FIG. 2 is a vertical sectional view of the furnace taken on the line II—II of FIG. 1.

Referring first to FIGS. 1 and 2, which show the general features of the invention, the waste liquor furnace, indicated generally by the reference numeral 10, is shown as consisting of a combustion chamber 11 and a boiler 12. The combustion chamber is defined by a front wall 13, a rear wall 14, side walls 15, a roof 16, and a bottom 17. The boiler 12 is provided with an upper steam-and-water drum 18 connected by downcomer tubes 19 to a lower drum 21. The lower drum is, in turn, connected by large downcomers 22 to headers 23 underlying the bottom 17 of the combustion chamber. Tubes extend upwardly from the headers 23 to define a tap hole 24 and then to act as cooling tubes for the bottom 17 before extending upwardly along the inner surface of the walls of the combustion chamber. All of the water-wall tubes ultimately discharge steam into the steam-and-water drum 18. Many tubes from the front wall 13 and the rear wall 14, however, are bent into the interior of the combustion chamber to form screens 25 and 26. The screen 25 is made up of tubes which originate in the front wall 13, each tube being provided with a rearwardly and upwardly sharply-inclined portion joined to a vertical portion which extends upwardly through the furnace. The spacing is quite wide, as is evident in FIG. 2. The screen 26 is formed from water tubes which originate in the rear wall 14 and are provided with forwardly and upwardly sharply-inclined lower portions which terminate in vertical portions extending upwardly into the furnace. The inclined portions of the tubes in the two screens are opposed to one another, as is evident in FIG. 1. The side walls 15 are provided with opposed abutments 27 and 28, each having a downwardly-facing lower surface. The abutment 27 carries burners having waste liquor guns 29 and 31. The abutment is also provided with regular fuel-burning burners having fuel guns 32 and 33 alternated with the waste liquor guns 29 and 31. Similar alternating burners are provided on the abutment 28. All burners are of the inter-tube directional-flame type shown and described in the patent of Miller, No. 2,947,289, and are provided with adjustable vanes for controlling the flow of air around the guns. The abutments 27 and 28 define with the bottom 17 a high-temperature cell 34 which is lined with refractory.

The rear wall 14 terminates short of the roof 16 and thus defines a gas off-take 35 leading to a back pass 36. The back pass 36 is the general area occupied by the downcomer tubes 19 and lies under the roof 16 with the steam-and-water drum 18. Its bottom is defined by a steeply-inclined bottom wall 37 under which lies the lower drum 21. Underlying the rear of the back pass 36 is a tubular air heater 38 at the bottom of which is attached a dust collector 39 whose air outlet is connected to a breaching 41 leading to the stack (not shown). The dust collector is provided with an inclined classifying baffle 42 underlying the air heater and extending slightly in front of the opening to the breaching 41. The bottom of the dust collector is connected to a suitable disposal means 43. Adjacent the gas off-take 36 and lying entirely rearwardly of the rear wall 14 of the combustion chamber is a pendant convection superheater 44 whose inlet is connected to the top of the steam-and-water drum 18 and whose outlet is connected to a superheated steam header 45. The tubes forming the screen 25, the screen 26, the superheater 44, and the downcomer tubes 19 are all arranged in widely-spaced platens, one platen of each element lying in one of a series of parallel vertical planes. For instance, one platen of the screen 25 lies in the same longitudinal plane as a corresponding platen of the screen 26, a platen of the superheater 44, and a platen of the downcomer tubes 19.

A retractible blower 46 is provided extending transversely across the screen 25. A similar blower 47 is associated with the screen 26. A retractible blower 48 operates across the furnace in the gas off-take 36, while a blower 49 is located in the midst of the downcomer tubes 19. A water spray 51 is located at the top of the air heater 38; the air heater tubes 57 are horizontally arranged with the air passing through the tubes and the gas passing over the exterior. The air heater is connected by an inlet duct 52 to a forced-draft fan (not shown) and connected by an outlet duct 53 to the air plenum chambers associated with the burners.

Figure 4:
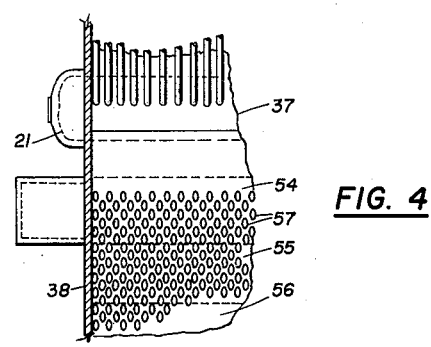
FIG. 4 is a view of a portion of the apparatus taken on the line IV—IV of FIG. 1.

In FIG. 4 it can be seen that the air heater 38 is divided by suitable perforated walls into sections 54, 55, and 56 through which the air successively passes. The tubes 57 which carry the air through these portions are of oval cross-section with the major axis vertical and the tubes are arranged in the staggered relationship shown in the drawing. This figure shows particularly well the manner in which the platens of downcomer tubes 19 emerge from the lower drum 21 and extend through the bottom wall 37 on their way upwardly to the steam-and-water drum 18.

Figure 6:
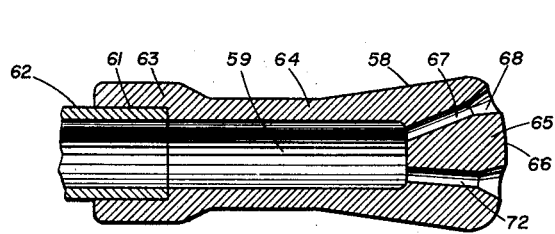
FIG. 6 is a sectional view of the nozzle taken on the line VI—VI of FIG. 5.
Figure 5:
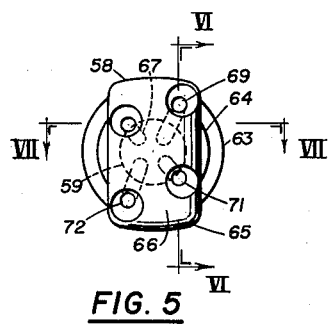
FIG. 5 is an end view of a nozzle used in the apparatus.
Figure 7:
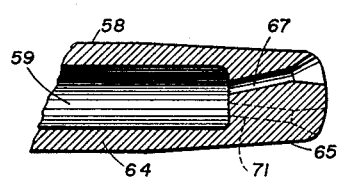
FIG. 7 is a horizontal sectional view of the nozzle taken on the line VII—VII of FIG. 5.

FIGS. 5, 6, and 7 show the details of one of the waste liquor nozzles which are used in the guns 29 and 31 of the abutment 27 on the side wall 15 and corresponding guns 73 and 74 on the abutment 28. Each nozzle 58 is provided with a bore 59 which, at the outer end, is provided with a counterbore 61 adapted to receive a liquor supply pipe 62, the counterbore 61 being housed in an enlarged portion 63 of the nozzle. The nozzle is provided with a generally cylindrical intermediate portion 64 which merges into a generally conical-shaped head 65. The head 65 terminates in an end surface 66 which is generally rectangular (with the long dimension vertical) and which is provided with rounded corners. A passage 67 of relatively small diameter extends from the bottom of the bore 59 to the face 66. This passage is provided with an outwardly-flared conical portion 68 adjacent the face 66. Similar passages 69, 71, and 72 extend from the bore 59 to the face 66 of the head of the nozzle. As is evident in the drawings, these passages have axes which extend at substantial angles to one another. For instance, the passages 67 and 72 are in the same general vertical plane. This plane resides at a substantial horizontal angle to the axis of the bore 59 and the passages 67 and 72 reside at a substantial vertical angle to one another. The other two passages 69 and 71, while they reside in the same general vertical plane, reside at a substantial horizontal angle to the axis of the bore 59 and at a substantial vertical angle to one another. At the same time, the separate pairs extend at different angles from one another, so that generally speaking, the passage 69 extends upwardly at a high angle, the passage 67 resides at a low angle above the axis of the bore, the passage 71 resides at a low angle below the axis of the bore, while the passage 72 resides at a large angle below the axis of the bore. It should be noted that the bottom of the bore 59 into which the passages enter is rounded to give good flow and to reduce corners into which material may accumulate.

Figure 3:
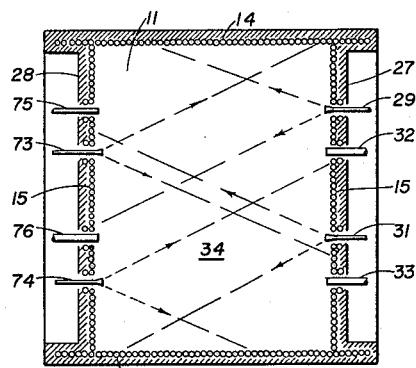
FIG. 3 is a horizontal sectional view of the furnace taken on the line III—III of FIG. 2.

Referring again to FIG. 3, it should be noted that the abutment 28 is provided with burners carrying waste liquor guns 73 and 74 and fuel-burning guns 75 and 76. It also should be noted that the gun 75 resides opposite the waste liquor gun 29, while the waste liquor gun 73 resides opposite the fuel gun 32; the fuel gun 76 resides opposite the waste liquor gun 31, and the waste liquor gun 74 resides opposite the fuel gun 33.

The operation of the invention will now be readily understood in view of the above description. Fuel enters the fuel guns 32, 33, 75, and 76 and are projected into the high-temperature cell 34 in the usual way. The vanes in the burners are adjusted to give a proper flow of fuel and air into the cell to promote turbulence and proper combustion. Waste liquor is introduced into this same furnace through the waste liquor guns 29, 31, 73, and 74. The fuel is sprayed in the intersecting, substantially conical pattern shown in FIG. 3, so that complete mixing takes place between the fuel and air and between the waste liquor and air. Each of the nozzles produces a wide, flaring spray by the passage of the liquor into the bore 59 and outwardly through the passages 67, 69, 71, and 72. Because of the restricted volume in the low-temperature cell and the fact that extreme turbulence and proper control of air flow takes place, the temperature is quite high. This is added to by the fact that this cell is covered with refractory. The net effect is not only to change all the water in the waste liquor to a vapor, but also to produce combustion or oxidation of the solid particles remaining after the water has been so evaporated. A considerable portion of the unburnable solid matter and burned solid matter will be reduced by the extreme temperature to a molten slag which will flow onto the bottom 17 and can be removed through the tap hole 24. The abutments 27 and 28 afford only a restricted passage into the remainder of the combustion chamber and this inhibits the passage of slag upwardly. However, the products of combustion will contain considerable solids, some in molten form and some in solid form.

Because of the abutments 27 and 28, the products of combustion, as they pass upwardly through the furnace, pass in a flow which is fairly widely separated from the side walls 15. Eventually, the gas passes through the screens 25 and 26. Now, these screens not only have the effect of cooling the products of combustion and producing solid particles from any molten particles, but they also collect this material on their surfaces. Because of the inclined nature of the lower portions of the tubes in these screens, however, this material will slide down each individual tube and will drop off the screen and fall downwardly through the furnace onto the bottom 17 where it will be reduced to a molten consistency and pass through the tap hole 24. The products of combustion then pass through the gas off-take 36 and between the platens making up the convention superheater 44. From there, they pass through the platens formed of downcomer tubes 19 in the back pass 36. The gas is then passed downwardly through the air heater 38 and through the dust collector 39 to the breaching 41 at which time they are discharged into the atmosphere. The cooling effect of the superheater 44 and the platens of downcomer tubes 19 has a further effect of dropping out solid particles originally contained in the waste liquor. These particles fall on the surface of the bottom wall 37 and slide downwardly because of its inclined nature. The particles then fall through the widely-spaced tubes of the air heater 38, eventually falling into the dust collector 39 and into the disposal means 43. The water spray 51 passes downwardly through the air heater and washes the surface of the tubes 57. This water washing will serve to keep the tubes in the air heater clean, particularly in the case where the solids remaining from the evaporation of the water in the liquor are water soluble, and, in any case, will promote the flow of all solids downwardly into the dust collector. The reverse flow in the dust collector brought about by the baffle 42 causes most solids to be thrown downwardly into the bottom of the dust collector rather than to pass with the air into the breaching 41.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent, is:

1. A waste liquor furnace, comprising a boiler having a steam-and-water drum, a furnace having front, rear, side, roof, and bottom walls defining a combustion chamber, abutments extending inwardly from two opposed walls adjacent the bottom wall and having downwardly-facing lower surfaces, the said surfaces defining with the bottom wall a high-temperature cell, burner means mounted on the said lower surfaces of the abutments, said burner means including air supply means and spray means for projecting waste liquor into the high-temperature cell, each of the said burner means being provided with air vanes which are adjustable about horizontal axes, the said spray means consisting of a spray nozzle located centrally of each burner means in the flow of air downstream of the said air vanes to bring about intersection of the lines of action of the air and liquor and mixing of the air and liquor after the air has passed over the vanes.

2. A waste liquor furnace, comprising a boiler having a steam-and-water drum, a furnace having front, rear, side, roof, and bottom walls defining a combustion chamber, abutments extending inwardly from two opposed walls adjacent the bottom wall and having downwardly-facing lower surfaces, the said surfaces defining the bottom wall a high-temperature cell, burner means mounted on the said lower surfaces of the abutments, said burner means including air supply means and spray means for projecting waste liquor into the high-temperature cell, the said spray means projecting the liquor in a plurality of atomized sprays, each spray means producing a spray having the shape of an imaginary cone, the spray means positioned so that the vertices of the imaginary cones of spray are located on opposite, staggered positions on the said two opposed walls within the said cell, the cones having their vertices on the same wall intersecting midway between the said opposed walls, and each cone originating on one of the said opposed walls intersecting a cone originating on the other of the said opposed walls midway between the said opposed walls.

3. A waste liquor furnace, comprising a boiler having a steam-and-water drum, a furnace having front, rear, side, roof, and bottom walls defining a combustion chamber, abutments extending inwardly from two opposed walls adjacent the bottom wall and having downwardly-facing lower surfaces, the said surfaces defining with the bottom wall a high-temperature cell, burner means mounted on the said lower surfaces of the abutments, said burner means including air supply means and spray means for projecting waste liquor into the high-temperature cell, each of the said burner means being provided with air vanes which are adjustable about horizontal axes, the said spray means consisting of a spray nozzle located centrally of each burner means in the flow of air downstream of the said air vanes to bring about intersection of the lines of action of the air and liquor and mixing of the air and liquor after the air has passed over the vanes, the said means projecting the liquor in a plurality of atomized sprays, each spray means producing a spray having the shape of an imaginary cone, the spray means positioned so that vertices of the imaginary cones of spray, are located on opposite, staggered positions on the said two opposed walls within the said cell, the cones having their vertices on the same wall intersecting midway between the said opposed walls, and each cone originating on one of the said opposed walls intersecting a cone originating on vertices on the same wall intersecting midway between the said opposed walls.

4. A waste liquor furnace, comprising a boiler having a steam-and-water drum, a furnace having front, rear, side, roof, and bottom walls defining a combustion chamber, abutments extending inwardly from two opposed walls adjacent the bottom wall and having downwardly-facing lower surfaces, the said surfaces defining with the bottom wall a high-temperature cell, burner means mounted on the said lower surfaces of the abutments, said burner means including air supply means and spray means for projecting waste liquor into the high-temperature cell, each of the said burner means being provided with air vanes which are adjustable about horizontal axes, the said spray means consisting of a spray nozzle located centrally of each burner means in the flow of air downstream of the said air vanes to bring about intersection of the lines of action of the air and liquor and mixing of the air and liquor after the air has passed over the vanes, a plurality of water tube platens extending across the top of the combustion chamber adjacent the roof wall, each platen consisting of a number of tubes lying in the same general vertical plane, each of the said tubes having a vertical upper portion and a lower portion which is inclined at a substantial angle to the horizontal.

5. A waste liquor furnace, comprising a boiler having a steam-and-water drum, a furnace having front, rear, side, roof, and bottom walls defining a combustion chamber, abutments extending inwardly from two opposed walls adjacent the bottom wall and having downwardly-facing lower surfaces, the said surfaces defining with the bottom wall a high-temperature cell, burner means mounted on the said lower surfaces of the abutments, said burner means including air supply means and spray means for projecting waste liquor into the high-temperature cell, the said spray means projecting the liquor in a plurality of atomized sprays, each spray means producing a spray having the shape of an imaginary cone, the spray means positioned so that vertices of the imaginary cones of spray are located on opposite, staggered positions on the said two opposed walls within the said cell, the cones having their vertices on the same wall intersecting midway between the said opposed walls, and each cone originating on one of the said opposed walls intersecting a cone originating on the other of the said opposed walls midway between the said opposed walls, a plurality of water tube platens extending across the top of the combustion chamber adjacent the roof wall, each platen consisting of a number of tubes lying in the same general vertical plane, each of the said tubes having a vertical upper portion and a lower portion which is inclined at a substantial angle to the horizontal.

6. A waste liquor furnace, comprising a boiler having a steam-and-water drum, a furnace having front, rear, side, roof, and bottom walls defining a combustion chamber, abutments extending inwardly from two opposed walls adjacent the bottom wall and having downwardly-facing lower surfaces, the said surfaces defining with the bottom wall a high-temperature cell, burner means mounted on the said lower surfaces of the abutments, said burner means including air supply means and spray means for projecting waste liquor into the high-temperature cell, each of the said burner means being provided with air vanes which are adjustable about horizontal axes, the said spray means consisting of a spray nozzle located centrally of each burner means in the flow of air downstream of the said air vanes to bring about intersection of the lines of action of the air and liquor and mixing of the air and liquor after the air has passed over the vanes, the boiler being provided with a convection section located in the flow of gas after it leaves the combustion chamber, a plurality of water tube screens located at the upper part of the combustion chamber, and a plurality of soot blowers located among the screens to remove accumulations on the screens.

7. A waste liquor furnace, comprising a boiler having a steam-and-water drum, a furnace having front, rear, side, roof, and bottom walls defining a combustion chamber, abutments extending inwardly from two opposed walls adjacent the bottom wall and having downwardly-facing lower surfaces, the said surfaces defining with the bottom wall a high-temperature cell, burner means mounted on the said lower surfaces of the abutments, said burner means including air supply means and spray means for projecting waste liquor into the high-temperature cell, the said spray means projecting the liquor in a plurality of atomized sprays, each spray means producing a spray having the shape of an imaginary cone, the spray means positioned so that vertices of the imaginary cones of spray are located on opposite, staggered positions on the said two opposed walls within the said cell, the cones having their vertices on the same wall intersecting midway between the said opposed walls, and each cone originating on one of the said opposed walls intersecting a cone originating on the other of the said opposed walls midway between the said opposed walls, the boiler being provided with a convection section located in the flow of gas after it leaves the combustion chamber, a plurality of water tube screens located at the upper part of the combustion chamber, and a plurality of soot blowers located among the screens to remove accumulations on the screens.

8. A waste liquor furnace, comprising a boiler having a steam-and-water drum, a furnace having front, rear, side, roof, and bottom walls defining a combustion chamber, abutments extending inwardly from two opposed walls adjacent the bottom wall and having downwardly-facing lower surfaces, the said surfaces defining with the bottom wall a high-temperature cell, burner means mounted on the said lower surfaces of the abutments, said burner means including air supply means and spray means for projecting waste liquor into the high-temperature cell, each of the said burner means being provided with air vanes which are adjustable about horizontal axes, the said spray means consisting of a spray nozzle located centrally of each burner means in the flow of air downstream of the said air vanes to bring about intersection of the lines of action of the air and liquor and mixing of the air and liquor after the air has passed over the vanes, a gas off-take formed at the upper part of the rear wall, an upper pass leaving the gas off-take, the boiler having a convection section located in the said upper pass, the upper pass having a bottom surface extending under the convection section at a substantial angle to the horizontal.

9. A waste liquor furnace, comprising a boiler having a steam-and-water drum, a furnace having front, rear, side, roof, and bottom walls defining a combustion chamber, abutments extending inwardly from two opposed walls adjacent the bottom wall and having downwardly-facing lower surfaces, the said surfaces defining with the bottom wall a high-temperature cell, burner means mounted on the said lower surfaces of the abutments, said burner means including air supply means and spray means for projecting waste liquor into the high-temperature cell, the said spray means projecting the liquor in a plurality of atomized sprays, each spray means producing a spray having the shape of an imaginary cone, the spray means positioned so that vertices of the imaginary cones of spray are located on opposite, staggered positions on the said two opposed walls within the said cell, the cones having their vertices on the same wall intersecting midway between the said opposed walls, and each cone originating on one of the said opposed walls intersecting a cone originating on the other of the said opposed walls midway between the said opposed walls, a gas off-take formed at the upper part of the rear wall, an upper pass leaving the gas off-take, a boiler having a convection section located in the said upper pass, the upper pass having a bottom surface extending under the convection section at a substantial angle to the horizontal.

References Cited by the Examiner
UNITED STATES PATENTS

| 1,565,304 | 12/25 | Bell | 122—390 |
| 1,780,300 | 11/30 | Jacobus et al. | 165—95 |
| 2,213,052 | 8/40 | Rosencrants et al. | 122—7 |
| 2,416,462 | 2/47 | Wilcoxson | 122—235 |
| 2,636,812 | 4/53 | Singleton | 23—48 |
| 2,804,287 | 8/57 | Huet | 165—165 |
| 2,853,059 | 9/58 | Craig | 122—235 |
| 2,911,199 | 11/59 | Huet | 165—165 |
| 3,047,362 | 7/62 | Smith | 110—7 |

FOREIGN PATENTS

| 574,767 | 4/59 | Canada. |
| 971,097 | 12/58 | Germany. |
| 59,230 | 4/38 | Norway. |
| 72,685 | 10/47 | Norway. |

OTHER REFERENCES

Steam, its Generation and Use, 37th ed., 1955, pub. by the Babcock and Wilcox Co., New York (pp. 20–10 and 20–11 relied upon).

PERCY L. PATRICK, *Primary Examiner.*

FREDERICK L. MATTESON, Jr., MEYER PERLIN, *Examiners.*